United States Patent
Bhatia

(10) Patent No.: US 12,524,472 B1
(45) Date of Patent: Jan. 13, 2026

(54) SYSTEM AND A METHOD FOR EXTRACTING AND SELECTING ATTRIBUTES USING MULTI-MODEL DIFFERENTIAL ACCURACY ANALYSIS

(71) Applicant: Brightleaf Solutions, Inc., Brookline, MA (US)

(72) Inventor: Samir Bhatia, Brookline, MA (US)

(73) Assignee: Brightleaf Solutions, Inc.

( * ) Notice: Subject to any disclaimer, the term of this patent is extended or adjusted under 35 U.S.C. 154(b) by 0 days.

(21) Appl. No.: 19/254,397

(22) Filed: Jun. 30, 2025

(51) Int. Cl.
| | |
|---|---|
| G06F 16/90 | (2019.01) |
| G06F 16/2458 | (2019.01) |
| G06F 16/903 | (2019.01) |
| G06F 16/907 | (2019.01) |
| G06F 18/21 | (2023.01) |
| G06F 30/27 | (2020.01) |

(52) U.S. Cl.
CPC ........ G06F 16/907 (2019.01); G06F 16/2458 (2019.01); G06F 16/90344 (2019.01); G06F 18/217 (2023.01); G06F 30/27 (2020.01)

(58) Field of Classification Search
CPC .......... G06F 16/2458; G06F 16/90344; G06F 16/907; G06F 18/217; G06F 30/27
See application file for complete search history.

(56) References Cited

U.S. PATENT DOCUMENTS

| | | | |
|---|---|---|---|
| 8,244,649 B2 | 8/2012 | Connell | |
| 10,922,358 B2 | 2/2021 | Garg et al. | |
| 11,048,711 B1 * | 6/2021 | Fleming | G06F 40/284 |
| 12,254,029 B1 | 3/2025 | Veillon et al. | |
| 2013/0318426 A1 * | 11/2013 | Shu | G06V 30/412 |
| | | | 715/226 |
| 2019/0130904 A1 * | 5/2019 | Homma | G10L 15/22 |
| 2021/0124919 A1 * | 4/2021 | Balakrishnan | B42D 25/309 |
| 2022/0350814 A1 | 11/2022 | Owen et al. | |

OTHER PUBLICATIONS

Jay Mishra, How Generative AI Is Transforming Text Data Extraction, Builtin, Jul. 18, 2024. https://builtin.com/articles/how-generative-ai-transforming-text-data-extraction.

* cited by examiner

Primary Examiner — Diedra McQuitery
(74) Attorney, Agent, or Firm — Jason C. Cameron

(57) ABSTRACT

A system for extracting and selecting attributes using multi-model differential accuracy analysis is disclosed. The system includes an attribute defining module receive user input defining a plurality of data attributes to be extracted from a document. A multi-model attribute extraction module extracts the plurality of data attributes from the document using a plurality of techniques. A differential analysis module performs a comparison among a plurality of attribute values extracted by the plurality of extraction techniques and determines an agreement level based on the comparison. A score generation module assigns a validation score to each of the extracted values based on the agreement level and computes a confidence score. A decision module selects the plurality of attribute value with a highest confidence score as a final data attribute value. A reviewer module enables specialist validation, and a feedback module updates the extraction module to improve future performance.

15 Claims, 5 Drawing Sheets

SYSTEM AND A METHOD FOR EXTRACTING AND SELECTING ATTRIBUTES USING MULTI-MODEL DIFFERENTIAL ACCURACY ANALYSIS

FIELD OF INVENTION

Embodiments of the present disclosure relate to the field of document processing and more particularly, a system and a method for extracting and selecting attributes using multi-model differential accuracy analysis.

BACKGROUND

Extraction of structured data from unstructured or semi-structured machine-readable documents and other electronically represented sources is a critical function across various industries. Legal documents, in particular, present unique challenges for data extraction systems. The legal documents are drafted in diverse formats and languages, making consistent and accurate data extraction difficult.

Several methods are used for extracting data from documents, including traditional rule-based techniques, machine learning (ML)-based models, generative AI (GenAI)-powered models and the like. The traditional rule-based techniques may work well with standardized templates but are less effective with complex or non-standard documents. The machine learning models enhance accuracy but typically require large volumes of labeled data for training. The generative AI (GenAI) models, including large language models (LLMs), demonstrate strong capabilities in understanding natural language but may introduce inconsistencies or misinterpretations, especially when applied to specialized legal language.

Despite producing extraction results, each method may yield varying levels of accuracy. It is often said that "If a sentence is given to ten lawyers, it may result in ten different interpretations". This variation in interpretation introduces inconsistency and may lead to incorrect or incomplete data, impacting compliance, risk assessment, and contract lifecycle management. Therefore, it becomes essential to identify and select the most reliable extraction methods.

Hence, there is a need for an improved system and a method for extracting and selecting attributes using multi-model differential accuracy analysis which addresses the aforementioned issue(s).

OBJECTIVES OF THE INVENTION

The primary objective of the invention is to identify most accurate attribute value by performing a differential analysis across multiple extraction techniques, (such as rule-based, machine learning (ML), and generative AI (GenAI)), assigning agreement levels, and generating validation and confidence scores to guide most accurate attribute value selection.

BRIEF DESCRIPTION

In accordance with an embodiment of the present disclosure, a system for extracting and selecting attributes using multi-model differential accuracy analysis is provided. The system includes a hardware processor and a memory coupled to the hardware processor. The memory comprises a set of program instructions in the form of a processing subsystem hosted on a server and configured to execute on a network to control bidirectional communications among a plurality of modules. The processing subsystem includes an attribute defining module, configured to receive user input defining a plurality of data attributes to be extracted from a document. The processing subsystem includes a multi-model attribute extraction module operatively coupled to the attribute defining module. The multi-model attribute extraction module is configured to extract the plurality of data attributes from the document using a plurality of techniques. The processing subsystem includes a differential analysis module operatively coupled to the multi-model attribute extraction module. The differential analysis module is configured to perform a comparison among a plurality of attribute values extracted by the plurality of extraction techniques. The differential analysis module is configured to determine an agreement level based on the comparison. The agreement level includes one of full agreement, majority agreement, partial match, weak match, and no agreement. The processing subsystem includes a score generation module operatively coupled to the differential analysis module. The score generation module is configured to assign a validation score to each of the extracted values based on the agreement level. The score generation module is configured to compute a confidence score for each of the extracted attribute values using the validation score and a historical accuracy value associated with the corresponding plurality of techniques. The processing subsystem includes a decision module operatively coupled to the score generation module. The decision module is configured to select the plurality of attribute values with a highest confidence score as a final data attribute value. The processing subsystem includes a reviewer module operatively coupled to the decision module. The reviewer module is configured to allow a specialist to approve or modify the final data attribute value. The processing subsystem includes a feedback module operatively coupled to the reviewer module. The feedback module is configured to provide feedback to the multi-model attribute extraction module based on reviewer input to improve future extractions.

In accordance with an embodiment of the present disclosure, a method for extracting and selecting attributes using multi-model differential accuracy analysis is provided. The method includes receiving, by an attribute defining module, user input defining a plurality of data attributes to be extracted from a document. The method includes extracting, by a multi-model attribute extraction module, the plurality of data attributes from the document using a plurality of techniques. The method includes performing, by a differential analysis module, a comparison among a plurality of attribute values extracted by the plurality of extraction techniques. The method includes determining, by the differential analysis module, an agreement level based on the comparison. The agreement level includes one of full agreement, majority agreement, partial match, weak match, and no agreement. The method includes assigning, by a score generation module, a validation score to each of the extracted values based on the agreement level. The method includes computing, by the score generation module, a confidence score for each of the extracted attribute values using the validation score and a historical accuracy value associated with the corresponding plurality of techniques. The method includes selecting, by a decision module, the plurality of attribute value with a highest confidence score as a final data attribute value. The method includes allowing, by a reviewer module, a specialist to approve or modify the final data attribute value. The method includes providing, by a feedback module, feedback to the multi-model attribute extraction module based on reviewer input to improve future extractions.

In accordance with another embodiment of the present disclosure, a non-transitory computer-readable medium storing a computer program that, when executed by a processor, causes the processor to perform a method for extracting and selecting attributes using multi-model differential accuracy analysis is provided. The method includes receiving, by an attribute defining module, user input defining a plurality of data attributes to be extracted from a document. The method includes extracting, by a multi-model attribute extraction module, the plurality of data attributes from the document using a plurality of techniques. The method includes performing, by a differential analysis module, a comparison among a plurality of attribute values extracted by the plurality of extraction techniques. The method includes determining, by the differential analysis module, an agreement level based on the comparison. The agreement level includes one of full agreement, majority agreement, partial match, weak match, and no agreement. The method includes assigning, by a score generation module, a validation score to each of the extracted values based on the agreement level. The method includes computing, by the score generation module, a confidence score for each of the extracted attribute values using the validation score and a historical accuracy value associated with the corresponding plurality of techniques. The method includes selecting, by a decision module, the plurality of attribute value with a highest confidence score as a final data attribute value. The method includes allowing, by a reviewer module, a specialist to approve or modify the final data attribute value.

The method includes providing, by a feedback module, feedback to the multi-model attribute extraction module based on reviewer input to improve future extractions.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
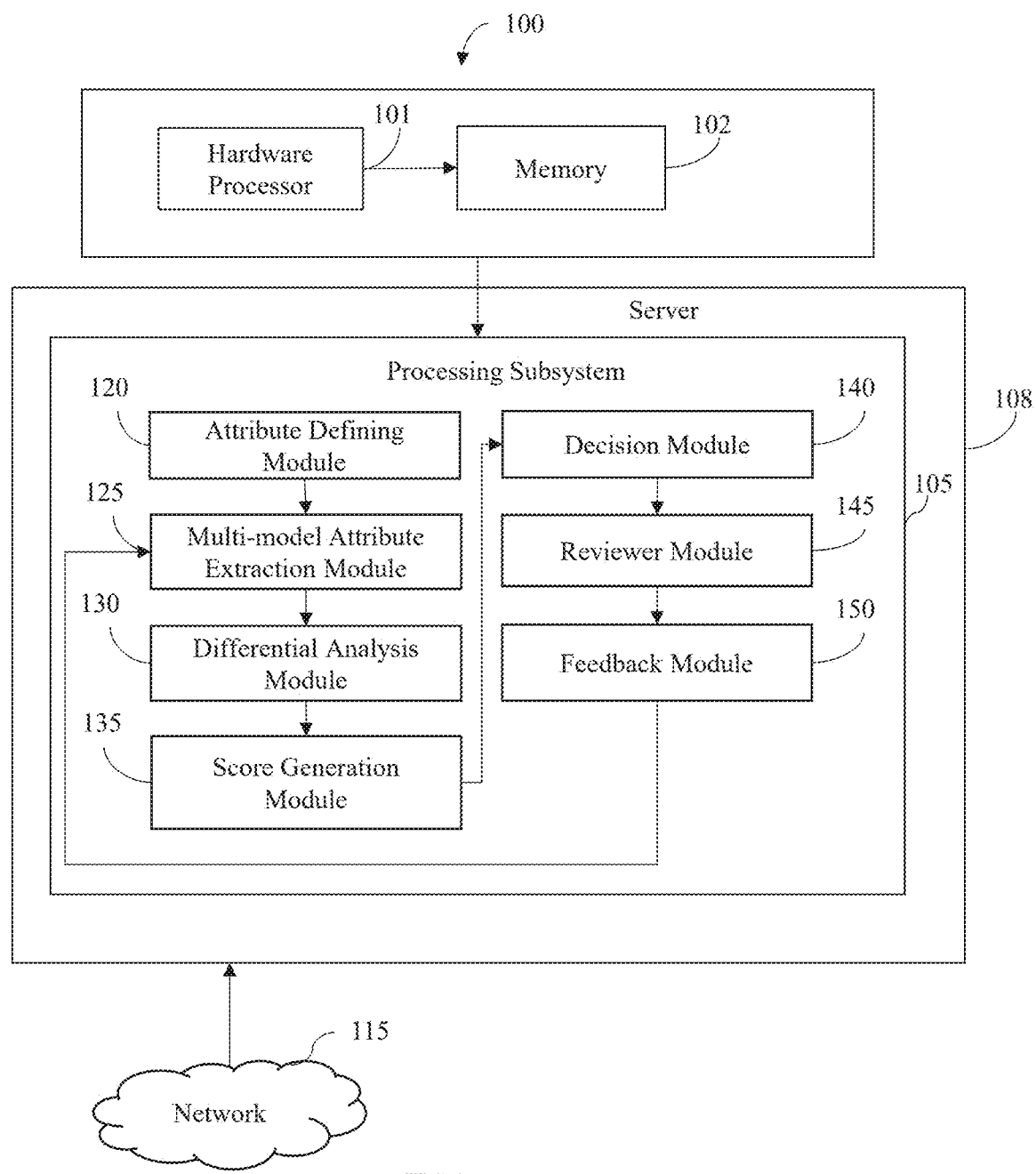
FIG. 1 is a block diagram representation of a system for extracting and selecting attributes using multi-model differential accuracy analysis in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiment of the present disclosure relates to a system for extracting and selecting attributes using multi-model differential accuracy analysis is provided. The system includes a hardware processor and a memory coupled to the hardware processor. The memory comprises a set of program instructions in the form of a processing subsystem hosted on a server and configured to execute on a network to control bidirectional communications among a plurality of modules. The processing subsystem includes an attribute defining module, configured to receive user input defining a plurality of data attributes to be extracted from a document. The processing subsystem includes a multi-model attribute extraction module operatively coupled to the attribute defining module. The multi-model attribute extraction module is configured to extract the plurality of data attributes from the document using a plurality of techniques. The processing subsystem includes a differential analysis module operatively coupled to the multi-model attribute extraction module. The differential analysis module is configured to perform a comparison among a plurality of attribute values extracted by the plurality of extraction techniques. The differential analysis module is configured to determine an agreement level based on the comparison. The agreement level includes one of full agreement, majority agreement, partial match, weak match, and no agreement. The processing subsystem includes a score generation module operatively coupled to the differential analysis module. The score generation module is configured to assign a validation score to each of the extracted values based on the agreement level. The score generation module is configured to compute a confidence score for each of the extracted attribute values using the validation score and a historical accuracy value associated with the corresponding plurality of techniques. The processing subsystem includes a decision module operatively coupled to the score generation module. The decision module is configured to select the plurality of attribute values with a highest confidence score as a final data attribute value. The processing subsystem includes a reviewer module operatively coupled to the decision module. The reviewer module is configured to allow a specialist to approve or modify the final data attribute value. The processing subsystem includes a feedback module operatively coupled to the reviewer module. The feedback module is configured to provide feedback to the multi-model attribute extraction module based on reviewer input to improve future extractions.

FIG. 1 is a block diagram representation of a system 100 for extracting and selecting attributes using multi-model differential accuracy analysis in accordance with an embodiment of the present disclosure. The system 100 includes a processing subsystem 105 hosted on a server 108. In one embodiment, the server 108 may include a cloud server. In another embodiment, the server 108 may include a local server. The processing subsystem 105 is configured to be executed on a network 115 to control bidirectional communications among a plurality of modules. In one embodiment, the network 115 may include a wired network such as a local area network (LAN) or Wide Area Network (WAN), such as the Internet. In another embodiment, the network 115 may include both wired and wireless communications according to one or more standards and/or via one or more transport mediums. In one example, the network 115 may include wireless communications according to one of the 802.11 or Bluetooth specification sets, or another standard or proprietary wireless communication protocol. In yet another embodiment, the network 115 may also include communications over a terrestrial cellular network, including a global system for mobile communications (GSM), code division multiple access (CDMA), and/or enhanced data for global evolution (EDGE) network.

The processing subsystem 105 includes an attribute defining module 120, configured to receive user input defining a plurality of data attributes to be extracted from a document. The plurality of data attributes refers to specific data fields to be identified and extracted from the document. The document is one of an unstructured document or a structured document and may be from any domain, such as legal, medical, financial, and the like. For example, in a legal document, the plurality of data attributes may include but are not limited to contract parties, effective dates, termination clauses, payment terms, governing law, and the like.

The processing subsystem 105 includes a multi-model attribute extraction module 125 operatively coupled to the attribute defining module 120. The multi-model attribute extraction module 125 is configured to extract the plurality of data attributes from the document using a plurality of techniques. The plurality of techniques includes but is not limited, a rule-based extraction, a machine learning-based extraction, a generative artificial intelligence (Gen AI)-based extraction, and the like.

More specifically, the rule-based extraction is configured to identify and extract a plurality of attribute values corresponding to the plurality of data attributes based on predefined rules and patterns. The predefined rules and patterns are typically designed by experts and define how specific entities, information, or features should be extracted. The predefined rules and patterns are often based on domain-specific knowledge, linguistic insights, or patterns recognized. The rule-based extraction is particularly effective for the structured documents with predictable formats. Examples of the rule-based extraction include, but are not limited to, regex-based extraction and are used for extracting dates and monetary values.

The machine learning-based extraction is configured to identify and extract the plurality of attribute values based on a trained machine learning model. The trained machine learning model is typically trained on historical, domain-specific labeled datasets and may capture more nuanced patterns within the semi-structured document or unstructured document. In an embodiment, machine learning-based extraction leverages ML, natural language processing (NLP), and optical character recognition (OCR) to enhance the efficiency and accuracy of data extraction tasks. The machine learning-based extraction introduces automation, accuracy, and the ability of the system 100 to handle complex, unstructured documents.

The generative artificial intelligence-based extraction is configured to divide the document into one or more sections and transform the one or more sections into a first set of vector embeddings. The first set of vector embeddings is stored in a vector database. Further, the generative artificial intelligence-based extraction is configured to receive and divide the user input corresponding to the plurality of data attributes to be extracted into one or more chunks and transform the one or more chunks into a second set of vector embeddings. Furthermore, the generative artificial intelligence-based extraction is configured to compare the second set of vector embeddings with the first set of vector embeddings to identify one or more relevant sections of the document and then transmit the one or more relevant sections and the user input to a large language model. The large language model is configured to extract the plurality of attribute values based on the one or more relevant sections from the document. Examples of the large language model include models provided by OpenAI, Claude AI, and the like.

The processing subsystem 105 includes a differential analysis module 130 operatively coupled to the multi-model attribute extraction module 125. The differential analysis module 130 is configured to perform a comparison among a plurality of attribute values extracted by the plurality of extraction techniques. Based on this comparison, the differential analysis module 130 determines an agreement level. The agreement level includes one full agreement, majority agreement, partial match, weak match, and no agreement. Assigning agreement levels helps quantify extraction consistency and improves attribute reliability.

Each extracted value is assessed against the agreement level, such as:
  Full Agreement—All extraction techniques output the same value.
  Majority Agreement—A majority of techniques extract overlapping or identical values.
  Partial Match—A technique's extracted value partially overlaps with another's but is not identical (e.g., "New York and Delaware" vs. "New York").

Weak Match—The extracted value differs significantly from the majority but with minor relevance or overlap.

No Agreement—All techniques extract different values with no discernible overlap or similarity.

The processing subsystem 105 includes a score generation module 135 operatively coupled to the differential analysis module 130. The score generation module 135 is configured to assign a validation score to each of the extracted values based on the agreement level. The validation score refers to a numerical representation of the level of agreement between the plurality of extraction techniques. Examples are shown below:

| Agreement level | Validation Score |
|---|---|
| Full Agreement | 1 |
| Majority Agreement | 0.9 |
| Partial Match | 0.8 |
| Weak Match | 0.7 |
| No Agreement | 0.5 |

In an embodiment, the plurality of techniques provide a visual representation of the extracted attribute values based on the validation score to assist a user in assessing the reliability of the extracted attribute values. Examples of the visual representation include color coding, heat maps, and the like.

The score generation module 135 is configured to compute a confidence score for each of the extracted attribute values using the validation score and a historical accuracy value associated with the corresponding plurality of techniques. The historical accuracy value represents past performance for each extraction technique based on previous extractions. The confidence score is defined as a product of the validation score and the historical accuracy value.

Confidence Score=Validation Score×Historical Accuracy value

The confidence score is based on consistency, historical accuracy, and individual model confidence.

The processing subsystem 105 includes a decision module 140 operatively coupled to the score generation module 135. The decision module 140 is configured to select the plurality of attribute values with a highest confidence score as a final data attribute value.

The processing subsystem 105 includes a reviewer module 145 operatively coupled to the decision module 140. The reviewer module 145 is configured to allow a specialist to approve or modify the final data attribute value, thereby ensuring precision. Since the specialist possesses expertise in the respective domain of the documents, they can validate, approve, or correct the final data attribute value selected by the decision module 140. This manual review process helps reduce potential errors that may arise from relying solely on system-generated outputs and enhances the overall accuracy and reliability of the extraction process.

The processing subsystem 105 includes a feedback module 150 operatively coupled to the reviewer module 145. The feedback module 150 is configured to provide feedback to the multi-model attribute extraction module 125 based on reviewer input to improve future extractions. The feedback is used to refine the performance of the plurality of extraction techniques for future document processing. This feedback is used to define the historical accuracy value. In an embodiment, the feedback is stored in the training data set to periodically retrain the machine learning model and generative AI model, thereby enabling adaptive learning and continuous improvement of the system over time.

In one embodiment, consider a use case in which an organization "X" processes thousands of contracts monthly to extract key attributes such as contract parties, effective dates, termination clauses, payment terms, and governing law. These attributes are crucial for clients' compliance, risk assessment, and contract lifecycle management. For illustrative purposes, the attribute "Governing Law" is considered:

Step 1: Attribute Extraction Via the Multi-Model Attribute Extraction Module 125:

The multi-model attribute extraction module 125 extracts the attribute values for the "Governing Law" attribute using the plurality of extraction techniques, including rule-based, machine learning-based, and generative AI-based models. Example Outputs:

| Extraction Techniques | Extracted Value |
|---|---|
| Rule-Based Extraction | New York |
| Machine Learning-Based Extraction | Nevada |
| Generative AI (OpenAI) | New York |
| Generative AI (Claude AI) | New York & Nevada |

Step 2: Differential Comparison by the Differential Analysis Module 130.

The differential analysis module 130 compares the extracted values and determines agreement levels based on predefined validation criteria:

| Extraction Techniques | Extracted Value | Agreement Level | Validation Score |
|---|---|---|---|
| Rule-Based Extraction | New York | Majority Agreement | 0.9 |
| Machine Learning-Based Extraction | Nevada | No Agreement | 0.5 |
| Generative AI (OpenAI) | New York | Majority Agreement | 0.9 |
| Generative AI (Claude AI) | New York & Nevada | Partial Match | 0.8 |

Step 3: Score Calculation by the Score Generation Module 135.

The score generation module 135 computes the confidence score for each extracted value by multiplying its validation score with the historical accuracy associated with that extraction technique:

| Extraction Techniques | Extracted Value | Validation Score | Historical Accuracy | Confidence Score |
|---|---|---|---|---|
| Rule-Based Extraction | New York | 0.9 | 90% | 81% |
| Machine Learning-Based Extraction | Nevada | 0.5 | 80% | 40% |
| Generative AI (OpenAI) | New York | 0.9 | 70% | 63% |
| Generative AI (Claude AI) | New York & Nevada | 0.8 | 65% | 52% |

Step 4: Selects the Final Attribute Value by the Decision Module 140.

The decision module 140 identifies the extracted value with the highest confidence score. In this example, the Rule-Based approach achieved the highest confidence score (81%); therefore, the final data attribute value for "Governing Law." will be "New York."

Step 5: Specialist Review by the Reviewer Module 145.

The reviewer module 145 enables the specialist to validate, approve, or revise the final data attribute value.

Step 6: Continuous Improvement by the Feedback Module 150.

The feedback module 150 provides the final attribute value and related details as feedback to the multi-model attribute extraction module 125, thereby improving future extraction accuracy.

It is to be noted that the system 100 may comprise, but is not limited to, a mobile phone, desktop computer, portable digital assistant (PDA), smart phone, tablet, ultra-book, netbook, laptop, multi-processor system, microprocessor-based or programmable consumer electronic system, or any other communication device that a user may use. In some embodiments, the system 100 may comprise a display module (not shown) to display information (for example, in the form of user interfaces). In further embodiments, the system may comprise one or more of touch screens, accelerometers, gyroscopes, cameras, microphones, global positioning system (GPS) devices, and so forth.

In one embodiment, the various functional components of the system 100 may reside on a single computer, or they may be distributed across several computers in various arrangements. The various components of the system 100 may, furthermore, access one or more databases, and each of the various components of the system 100 may be in communication with one another. Further, while the components of FIG. 1 are discussed in the singular sense, it will be appreciated that in other embodiments multiple instances of the components may be employed.

Figure 2:
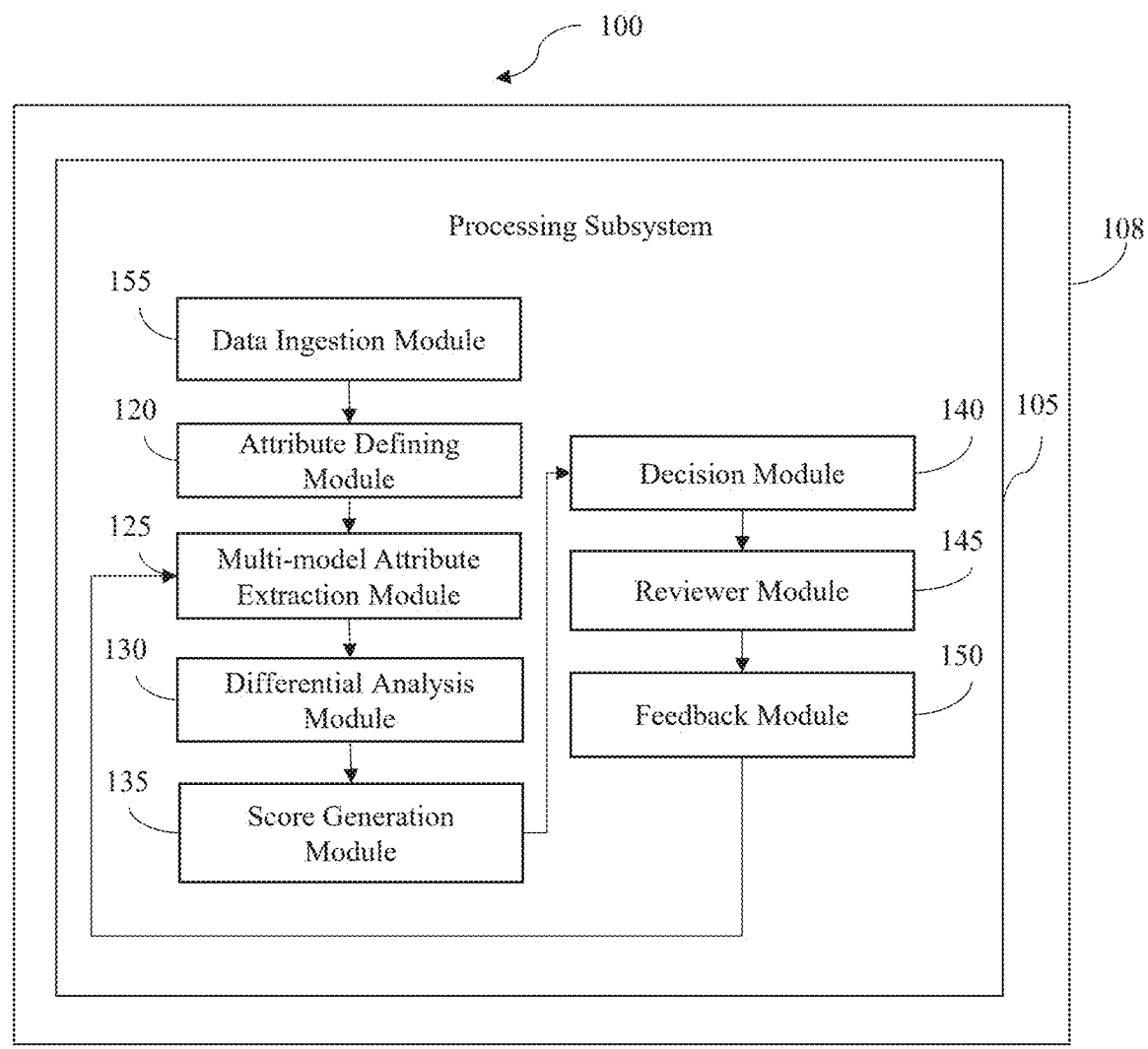
FIG. 2 is a schematic representation of an exemplary embodiment of the system for extracting and selecting attributes using multi-model differential accuracy analysis of FIG. 1 in accordance with an embodiment of the present disclosure.

FIG. 2 is a schematic representation of an exemplary embodiment of a system 100 for extracting and selecting attributes using multi-model differential accuracy analysis of FIG. 1 in accordance with an embodiment of the present disclosure. The system 100 of FIG. 1 includes an attribute defining module 120, a multi-model attribute extraction module 125, a differential analysis module 130, a score generation module 135, a decision module 140, a reviewer module 145, and feedback module 150. In one embodiment, the processing subsystem 105 includes a data ingestion module 155 is configured to receive and preprocess the document. The preprocessing comprises one of cleaning, formatting, and chunking. More specifically, the document intended for processing is first received by the data ingestion module. The data ingestion module 155 performs initial preprocessing operations such as removing noise or irrelevant characters (cleaning), standardizing document (formatting), and the like to facilitate subsequent processing stages.

Figure 3:
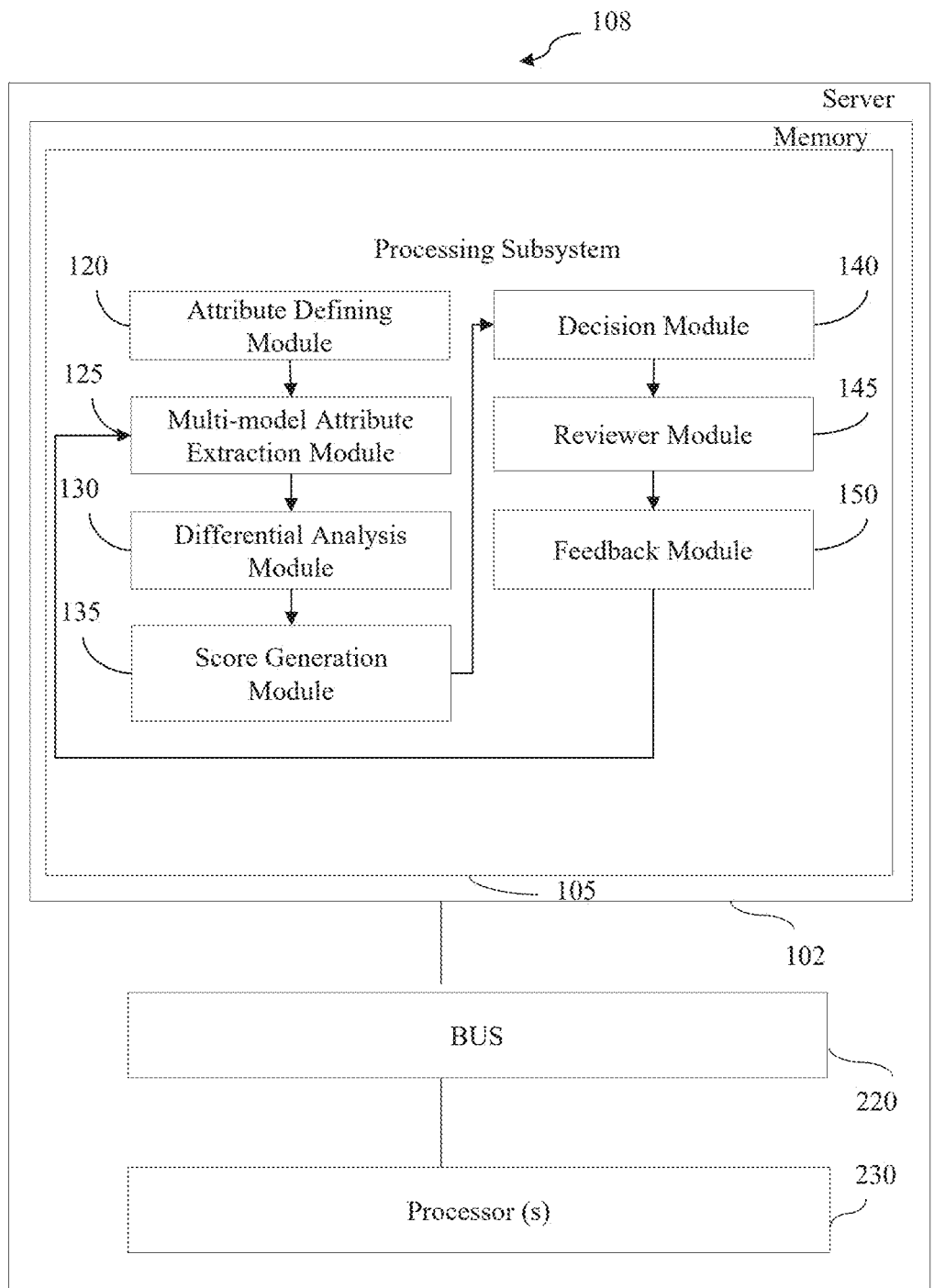
FIG. 3 is a block diagram of a computer or a server in accordance with an embodiment of the present disclosure; and FIG. 4a and FIG. 4b illustrates a flow chart representing the steps involved in a method for extracting and selecting attributes using multi-model differential accuracy analysis in accordance with an embodiment of the present disclosure.

FIG. 3 is a block diagram of a computer or a server 108 in accordance with an embodiment of the present disclosure. The server 108 includes processor(s) 230, and memory 102 operatively coupled to the bus 220. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 102 includes several subsystems stored in the form of computer-readable medium which instructs the processor to perform the method steps illustrated in FIG. 1. The memory 102 includes several subsystems stored in the form of executable program which instructs the processor 230 to perform the method steps illustrated in FIG. 1. The memory 102 includes a processing subsystem 105 of FIG. 1. The processing subsystem 105 further has following modules: an attribute defining module 120, a multi-model attribute extraction module 125, a differential analysis module 130, a score generation module 135, a decision module 140, a reviewer module 145, and feedback module 150.

In accordance with an embodiment of the present disclosure, a system 100 for extracting and selecting attributes using multi-model differential accuracy analysis is provided. The system 100 includes a hardware processor and a memory coupled to the hardware processor. The memory comprises a set of program instructions in the form of a processing subsystem 105 hosted on a server 108 and configured to execute on a network 115 to control bidirectional communications among a plurality of modules. The processing subsystem 105 includes an attribute defining module 120, configured to receive user input defining a plurality of data attributes to be extracted from a document. The processing subsystem 105 includes a multi-model attribute extraction module 125 operatively coupled to the attribute defining module 120. The multi-model attribute extraction module 125 is configured to extract the plurality of data attributes from the document using a plurality of techniques. The processing subsystem 105 includes a differential analysis module 130 operatively coupled to the multi-model attribute extraction module 125. The differential analysis module 130 is configured to perform a comparison among a plurality of attribute values extracted by the plurality of extraction techniques. The differential analysis module 130 is configured to determine an agreement level based on the comparison. The agreement level includes one of full agreement, majority agreement, partial match, weak match, and no agreement. The processing subsystem 105 includes a score generation module 135 operatively coupled to the differential analysis module 130. The score generation module 135 is configured to assign a validation score to each of the extracted values based on the agreement level. The score generation module 135 is configured to compute a confidence score for each of the extracted attribute values using the validation score and a historical accuracy value associated with the corresponding plurality of techniques. The processing subsystem 105 includes a decision module 140 operatively coupled to the score generation module 135. The decision module 140 is configured to select the plurality of attribute values with a highest confidence score as a final data attribute value. The processing subsystem 105 includes a reviewer module 145 operatively coupled to the decision module 140. The reviewer module 145 is configured to allow a specialist to approve or modify the final data attribute value. The processing subsystem 105 includes a feedback module 150 operatively coupled to the reviewer module 145. The feedback module 150 is configured to provide feedback to the multi-model attribute extraction module 125 based on reviewer input to improve future extractions.

While computer-readable medium is shown in an example embodiment to be a single medium, the term "computer-readable medium" should be taken to include a single medium or multiple media (for example, a centralized or distributed database, or associated caches and servers) able to store the instructions. The term "computer readable medium" shall also be taken to include any medium that is capable of storing instructions for execution by the machine and that cause the machine to perform any one or more of the methodologies disclosed herein. The term "computer-readable medium" includes, but not to be limited to, data repositories in the form of solid-state memories, optical media, and magnetic media.

The bus 220 as used herein refers to be internal memory channels or computer network that is used to connect computer components and transfer data between them. The bus 220 includes a serial bus or a parallel bus, wherein the serial bus transmits data in bit-serial format and the parallel bus transmits data across multiple wires. The bus 220 as used herein may include but not limited to, a system bus, an internal bus, an external bus, an expansion bus, a frontside bus, a backside bus, and the like.

Figure 4A:
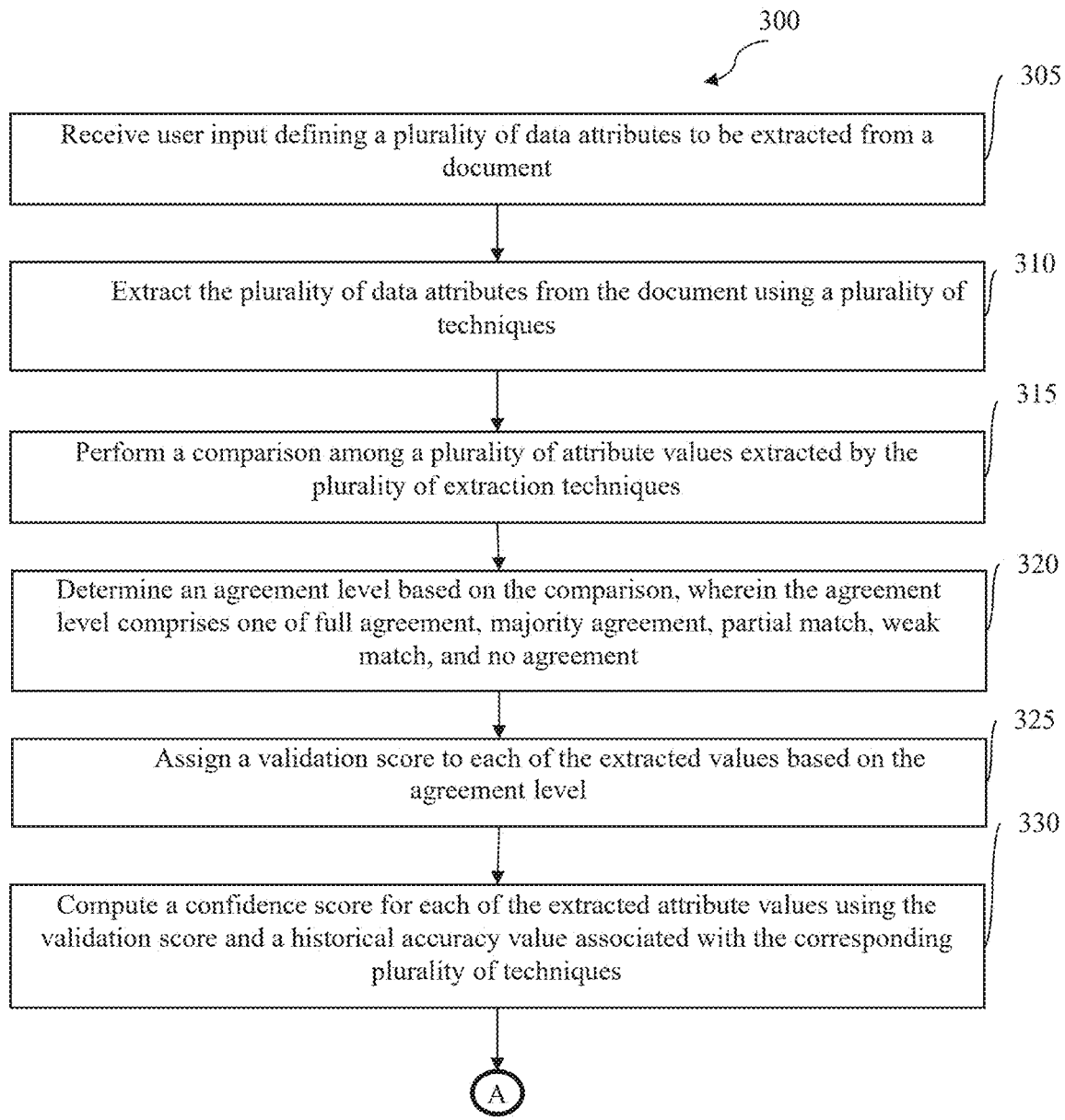
Figure 4B:
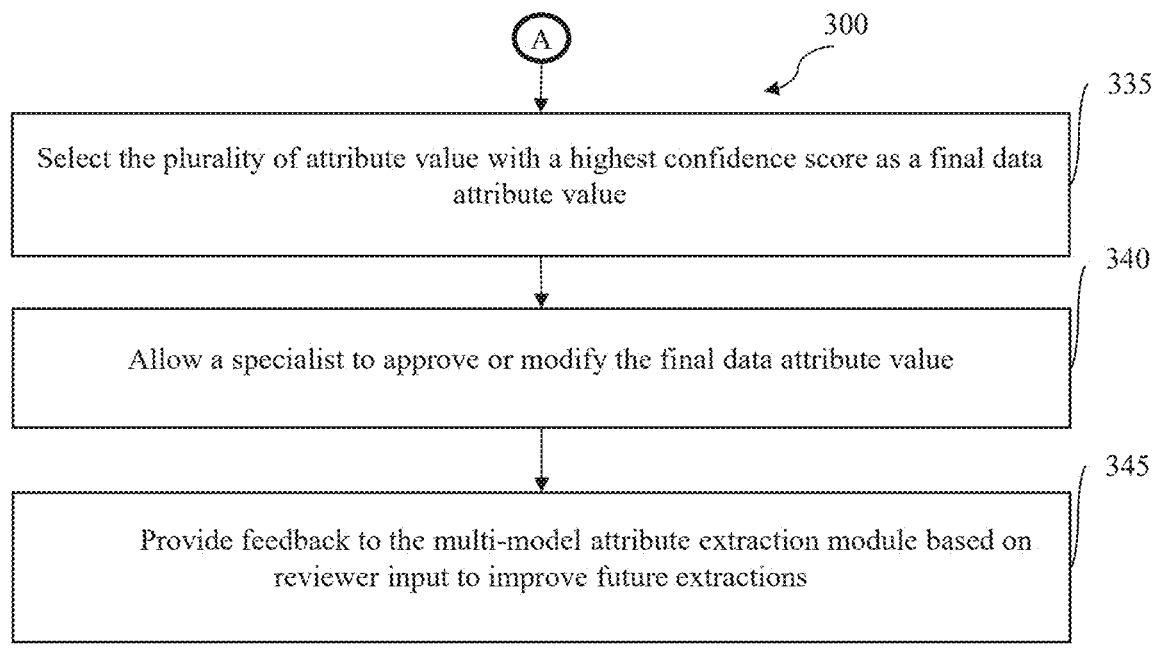

FIG. 4a and FIG. 4b illustrates a flow chart representing the steps involved in a method 300 for extracting and selecting attributes using multi-model differential accuracy analysis in accordance with an embodiment of the present disclosure. The method 300 begins at step 405.

At step 305, the method 300 includes receiving, by an attribute defining module, user input defining a plurality of data attributes to be extracted from a document. The plurality of data attributes refers to specific data fields to be identified and extracted from the document. The document is one of an unstructured document or a structured document and may be from any domain, such as legal, medical, financial, and the like. For example, in a legal document, the plurality of data attributes may include but are not limited to contract parties, effective dates, termination clauses, payment terms, governing law, and the like.

At step 310, the method 300 includes extracting, by a multi-model attribute extraction module, the plurality of data attributes from the document using a plurality of techniques. More specifically, the rule-based extraction is configured to identify and extract a plurality of attribute values corresponding to the plurality of data attributes based on predefined rules and patterns. The predefined rules and patterns are typically designed by experts and define how specific entities, information, or features should be extracted. The predefined rules and patterns are often based on domain-specific knowledge, linguistic insights, or patterns recognized. The rule-based extraction is particularly effective for the structured documents with predictable formats. Examples of the rule-based extraction includes but are not limited to regex-based extraction and are used for extracting dates and monetary values.

The machine learning-based extraction is configured to identify and extract the plurality of attribute values based on a trained machine learning model. The trained machine learning model is typically trained on historical, domain-specific labeled datasets and may capture more nuanced patterns within the semi-structured document or unstructured document. In an embodiment, machine learning-based extraction leverages ML, natural language processing (NLP), and optical character recognition (OCR) to enhance the efficiency and accuracy of data extraction tasks. The machine learning-based extraction introduces automation, accuracy, and the ability of the system to handle complex, unstructured documents.

The generative artificial intelligence-based extraction is configured to divide the document into one or more sections and transform the one or more sections into a first set of vector embeddings. The first set of vector embeddings is stored in a vector database. Further, the generative artificial intelligence-based extraction is configured to receive and divide the user input corresponding to the plurality of data attributes e to be extracted into one or more chunks and transforms the one or more chunks into a second set of vector embeddings. Furthermore, the generative artificial intelligence-based extraction is configured to compare the second set of vector embeddings with the first set of vector embeddings to identify one or more relevant sections of the document and then transmit the one or more relevant sections and the user input to a large language model. The large language model is configured to extract the plurality of attribute values based on the one or more relevant sections from the document. Examples of the large language model include models provided by OpenAI, Claude AI, and the like.

At step 315, the method 300 includes performing, by a differential analysis module, a comparison among a plurality of attribute values extracted by the plurality of extraction techniques.

At step 320, the method 300 includes determining, by the differential analysis module, an agreement level based on the comparison. The agreement level includes one of full agreement, majority agreement, partial match, weak match, and no agreement. Based on this comparison, the differential analysis module determines an agreement level. The agreement level includes one full agreement, majority agreement, partial match, weak match, and no agreement. Assigning agreement levels helps quantify extraction consistency and improves attribute reliability.

At step 325, the method 300 includes assigning, by a score generation module, a validation score to each of the extracted values based on the agreement level. The validation score refers to a numerical representation of the level of agreement between the plurality of extraction techniques.

At step 330, the method 300 includes computing, by the score generation module, a confidence score for each of the extracted attribute values using the validation score and a historical accuracy value associated with the corresponding plurality of techniques. The historical accuracy value represents past performance for each extraction technique based on previous extractions. The confidence score is defined as a product of the validation score and the historical accuracy value. The confidence score is based on consistency, historical accuracy, and individual model confidence.

At step 335, the method 300 includes selecting, by a decision module, the plurality of attribute value with a highest confidence score as a final data attribute value.

At step 340, the method 300 includes allowing, by a reviewer module, a specialist to approve or modify the final data attribute value. Since the specialist possesses expertise in the respective domain of the documents, they can validate, approve, or correct the final data attribute value selected by the decision module. This manual review process helps reduce potential errors that may arise from relying solely on system-generated outputs and enhances the overall accuracy and reliability of the extraction process.

At step 345, the method 300 includes providing feedback to the multi-model attribute extraction module based on reviewer input to improve future extractions. The feedback is used to refine the performance of the plurality of extraction techniques for future document processing. In an embodiment, the feedback is stored in the training data set to periodically retrain the machine learning model and generative AI model, thereby enabling adaptive learning and continuous improvement of the system over time.

The method 300 ends at step 345.

Various embodiments of the system 100 and method for extracting and selecting attributes using multi-model differential accuracy analysis provide several benefits, such as enhanced accuracy and consistency in attribute extraction. The multi-model attribute extraction module 125 enables extraction of metadata attributes by applying different methods, including rule-based, machine learning, and generative AI, thereby improving accuracy and performance across various document types. Further, better handling of complex legal language is enabled, as legal contracts often contain ambiguous, context-dependent clauses, combining rule-based logic with AI-driven interpretation improves extraction from both structured and unstructured text. The differential analysis module 130 ensures reliability of the system 100 by comparing extracted values and identifying the level of agreement, reducing inconsistencies that typically arise from relying on a single method. The score generation module 135 assigning the validation score and the confidence score based on historical accuracy, enhances data quality and trust. Automated confidence score calculation ensures that each extraction technique is weighted by historical accuracy, ensuring that more reliable methods have greater influence in the final decision. The decision module 140 enables optimal value selection. By selecting the optimal value automatically, the system 100 reduces manual review effort, saving time and effort. Furthermore, the reviewer module 145 incorporates expert review to the optimal value selected. This human oversight for final validation adding a layer of human judgment where AI-based extraction might have limitations. The feedback module 150 enhances learning and adaptability of the system 100 over time, thereby enabling continuous improvement.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field-programmable gate arrays (FPGAs), or any other equivalent integrated or discrete logic circuitry, as well as any combinations of such components. The term "processor" or "processing subsystem" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system for extracting and selecting a plurality of data attributes using multi-model differential accuracy analysis, comprising:
   a hardware processor; and
   a memory coupled to the hardware processor, wherein the memory comprises a set of program instructions in the form of a processing subsystem, configured to be executed by the hardware processor, wherein the processing subsystem is hosted on a server and configured to execute on a network to control bidirectional communications among a plurality of modules comprising:
      an attribute defining module, configured to receive user input defining the plurality of data attributes to be extracted from a document;
      a multi-model attribute extraction module operatively coupled to the attribute defining module,
   wherein the multi-model attribute extraction module is configured to extract a corresponding plurality of attribute values for each of the plurality of data attributes from the document using a plurality of extraction techniques,
   wherein the plurality of extraction techniques comprises at least one of a rule-based extraction, a machine learning-based extraction, and a generative artificial intelligence-based extraction,
   wherein the generative artificial intelligence-based extraction is configured to divide the document into one or more sections and transform the one or more sections into a first set of vector embeddings,
   wherein the first set of vector embeddings is stored in a vector database;
      a differential analysis module operatively coupled to the multi-model attribute extraction module, wherein the differential analysis module is configured to:
         for the each of the plurality of data attributes,
            perform a comparison among the corresponding plurality of attribute values extracted by the plurality of extraction techniques; and
            determine a respective level agreement level for each of the corresponding plurality of attribute values based on the comparison,
            wherein the respective agreement level comprises full agreement, when all of the plurality of extraction techniques output the each of the corresponding plurality of attributes, majority agreement, when more than half of the plurality of extraction techniques but not all output the each of the corresponding plurality of attributes, partial match, when half of the plurality of extraction techniques output the each of the corresponding plurality of attributes, weak match, when less than half of the plurality of extraction techniques output the each of the corresponding plurality of attributes, and no agreement when all of the plurality of extraction techniques output the each of the corresponding plurality of attributes that is not identical with other;
a score generation module operatively coupled to the differential analysis module, wherein the score generation module is configured to:
for the each of the plurality of data attributes,
assign a respective validation score to the each of the corresponding plurality of attribute values based on the respective agreement level; and
compute a respective confidence score for the each of the corresponding plurality of attribute values using the respective validation score and a respective historical accuracy value associated with a respective one of the plurality of extraction techniques that output the each of the corresponding plurality of attribute values;
a decision module operatively coupled to the score generation module, wherein the decision module is configured to select, for the each of the plurality of data attributes, a corresponding final attribute value from the corresponding plurality of attribute values, wherein the corresponding final attribute value has a highest the respective confidence score;
a reviewer module operatively coupled to the decision module, wherein the reviewer module is configured to:
for the each of the plurality of data attributes,
receive a respective reviewer input, wherein the respective reviewer input is to allow a specialist to approve or modify the corresponding final attribute value; and
a feedback module operatively coupled to the reviewer module, wherein the feedback module is configured to:
for the each of the plurality of data attributes,
provide a respective feedback to the multi-model attribute extraction module based on the respective reviewer input to improve future extractions.

2. The system of claim 1, comprising a data ingestion module configured to receive and preprocess the document, wherein the preprocessing comprises one of cleaning, formatting, and chunking.

3. The system of claim 1, wherein the document is one of an unstructured document or a structured document.

4. The system of claim 1, wherein the rule-based extraction is configured to, for the each of the plurality of data attributes, extract, from the document, a first attribute value forming one of the corresponding plurality of attribute values based on predefined rules and patterns.

5. The system of claim 1, wherein the machine learning-based extraction is configured to, for the each of the plurality of data attributes, extract, from the document, a second attribute value forming one of the corresponding plurality of attribute values based on a machine learning model trained on historical domain-specific data.

6. The system of claim 1, wherein the generative artificial intelligence-based extraction is configured to receive and divide the user input into one or more chunks and transforms the one or more chunks into a second set of vector embeddings.

7. The system of claim 6, wherein the generative artificial intelligence-based extraction is configured to compare the second set of vector embeddings with the first set of vector embeddings to identify one or more relevant sections of the document.

8. The system of claim 7, wherein the generative artificial intelligence-based extraction is configured to transmit the one or more relevant sections and the user input to a large language model.

9. The system of claim 8, wherein the large language model is configured to extract a third attribute value forming one of the corresponding plurality of attribute values based on the one or more relevant sections from the document.

10. The system of claim 8, wherein the large language model comprises a model provided by OpenAI or Claude AI.

11. The system of claim 1, wherein the respective confidence score is a product of the respective validation score and the respective historical accuracy value.

12. The system of claim 1, wherein the respective historical accuracy value represents past performance of the respective one of the extraction technique of the plurality of extraction techniques that output the each of the corresponding plurality of attribute values based on previous extractions.

13. The system of claim 1, wherein the plurality of extraction techniques provides a visual representation of the each of the corresponding plurality of attribute values based on the respective validation score to assist a user in assessing reliability of the each of the corresponding plurality of attribute values.

14. A method for extracting and selecting a plurality of data attributes using multi-model differential accuracy analysis, comprising:
receiving, by an attribute defining module, user input defining the plurality of data attributes to be extracted from a document;
extracting, by a multi-model attribute extraction module, a corresponding plurality of attribute values for each of the plurality of data attributes from the document using a plurality of extraction techniques,
wherein the plurality of extraction techniques comprises at least one of a rule-based extraction, a machine learning-based extraction, and a generative artificial intelligence-based extraction,
wherein the generative artificial intelligence-based extraction is configured to divide the document into one or more sections and transform the one or more sections into a first set of vector embeddings,
wherein the first set of vector embeddings is stored in a vector database;
for the each of the plurality of data attributes,
performing, by a differential analysis module, a comparison among the corresponding plurality of attribute values extracted by the plurality of extraction techniques; and
determining, by the differential analysis module, a respective agreement level for each of the corresponding plurality of attribute values based on the comparison, wherein the agreement level comprises full agreement, when all of the plurality of extraction techniques output the each of the corresponding plurality of attributes, majority agreement, when more than half of the plurality of extraction techniques but not all output the each of the corresponding plurality of attributes, partial match, when half of the plurality of extraction techniques output the each of the corresponding plurality of attributes, weak match, when less than half of the plurality of extraction techniques output the each of the corresponding plurality of attributes, and no agreement when all of the plurality of extraction techniques output the each of the corresponding plurality of attributes that is not identical with other;

for the each of the plurality of data attributes,
assigning, by a score generation module, a respective validation score to the each of the corresponding plurality of attribute values based on the respective agreement level; and
computing, by the score generation module, a respective confidence score for the each of the corresponding plurality of attribute values using the respective validation score and a respective historical accuracy value associated with a respective one of the plurality of extraction techniques that output the each of the corresponding plurality of attribute values;

for the each of the plurality of data attributes,
selecting, by a decision module, a corresponding final attribute value from the corresponding plurality of attribute values, wherein the corresponding final attribute value has a highest the respective confidence score;

for the each of the plurality of data attributes,
receiving, by a reviewer module, a respective reviewer input, wherein the respective reviewer input is to allow a specialist to approve or modify the corresponding final attribute value; and for the each of the plurality of data attributes,
providing, by a feedback module, a respective feedback to the multi-model attribute extraction module based on the respective reviewer input to improve future extractions.

15. A non-transitory computer-readable medium storing a computer program that, when executed by a processor, causes the processor to perform a method for extracting and selecting a plurality of data attributes using multi-model differential accuracy analysis, comprising:
receiving, by an attribute defining module, user input defining the plurality of data attributes to be extracted from a document;
extracting, by a multi-model attribute extraction module, a corresponding plurality of attribute values for each of the plurality of data attributes from the document using a plurality of extraction techniques,
wherein the plurality of extraction techniques comprises at least one of a rule-based extraction, a machine learning-based extraction, and a generative artificial intelligence-based extraction,
wherein the generative artificial intelligence-based extraction is configured to divide the document into one or more sections and transform the one or more sections into a first set of vector embeddings,
wherein the first set of vector embeddings is stored in a vector database;

for the each of the plurality of data attributes,
performing, by a differential analysis module, a comparison among the corresponding plurality of attribute values extracted by the plurality of extraction techniques; and
determining, by the differential analysis module, a respective agreement level for each of the corresponding plurality of attribute values based on the comparison, wherein the agreement level comprises full agreement, when all of the plurality of extraction techniques output the each of the corresponding plurality of attributes, majority agreement, when more than half of the plurality of extraction techniques but not all output the each of the corresponding plurality of attributes, partial match, when half of the plurality of extraction techniques output the each of the corresponding plurality of attributes, weak match, when less than half of the plurality of extraction techniques output the each of the corresponding plurality of attributes, and no agreement when all of the plurality of extraction techniques output the each of the corresponding plurality of attributes that is not identical with other;

for the each of the plurality of data attributes,
assigning, by a score generation module, a respective validation score to the each of the corresponding plurality of attribute values based on the respective agreement level; and
computing, by the score generation module, a respective confidence score for the each of the corresponding plurality of attribute values using the respective validation score and a respective historical accuracy value associated with a respective one of the plurality of extraction techniques that output the each of the corresponding plurality of attribute values;

for the each of the plurality of data attributes,
selecting, by a decision module, a corresponding final attribute value from the corresponding plurality of attribute values, wherein the corresponding final attribute value has a highest the respective confidence score;

for the each of the plurality of data attributes,
receiving, by a reviewer module, a respective reviewer input, wherein the respective reviewer input is to allow a specialist to approve or modify the corresponding final attribute value; and for the each of the plurality of data attributes,
providing, by a feedback module, a respective feedback to the multi-model attribute extraction module based on the respective reviewer input to improve future extractions.

* * * * *